July 5, 1932.  L. W. MELCHER  1,866,264

CAR TRUCK

Filed Feb. 1, 1929

Inventor
Lee W. Melcher
By Fred Gerlach Atty.

Patented July 5, 1932

1,866,264

UNITED STATES PATENT OFFICE

LEE W. MELCHER, OF DE PERE, WISCONSIN, ASSIGNOR TO THE FAFNIR BEARING COMPANY, OF NEW BRITAIN, CONNECTICUT, A CORPORATION OF CONNECTICUT

CAR TRUCK

Application filed February 1, 1929. Serial No. 336,874.

The present invention relates generally to mountings whereby journal boxes are held in connected relation with the pedestals of car trucks. More particularly the invention relates to that type of mounting which is adapted primarily for use with a journal box having a roller bearing for the axle and comprises a pair of plates which are connected pivotally to the sides of the box in order to permit the box to tilt or rock transversely in response to angular movement of the axle and have outwardly extending flanges for engaging slidably the legs of the pedestal.

One object of the invention is to provide a mounting of the aforementioned type which may be produced more readily and at a lower cost than mountings of a similar character heretofore designed in that the plates are formed of metal stampings and in such a manner that the side margins are bent or deflected outwardly to form the flanges for engaging slidably the pedestal.

Another object of the invention is to provide a journal box mounting of the character under consideration in which the flanges of the plates have the central portions thereof bulged or deflected inwardly so as to permit the box to tilt or rock transversely to a limited extent independently of the pivotal connections between the plates and the sides of the box.

A further object of the invention is to provide a mounting of the type last referred to in which the plates are welded to the sides of the box in such a manner that under unusual circumstances such, for example, as when the car truck is derailed, the welded joint breaks and enables the pivotal connections between the plates and the box to augment the action of the inwardly bulged flanges and permit the box to rock or tilt throughout a greater range of movement and thereby prevent damage to the flanges of the plates.

A still further object of the invention is to provide a mounting for a journal box which is generally of new and improved construction and is of an extremely simplified character.

Other objects of the invention and the various advantages and characteristics of the present mounting construction will be apparent from a consideration of the following detailed description.

The invention consists in the several novel features hereinafter set forth and more particularly defined by the claims at the conclusion hereof.

Figure 1:
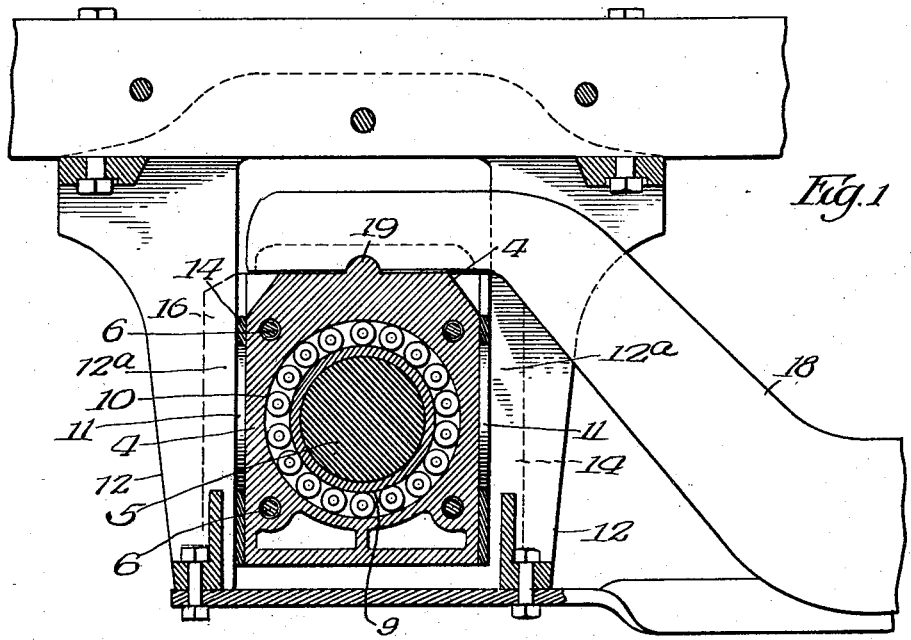
Figure 2:
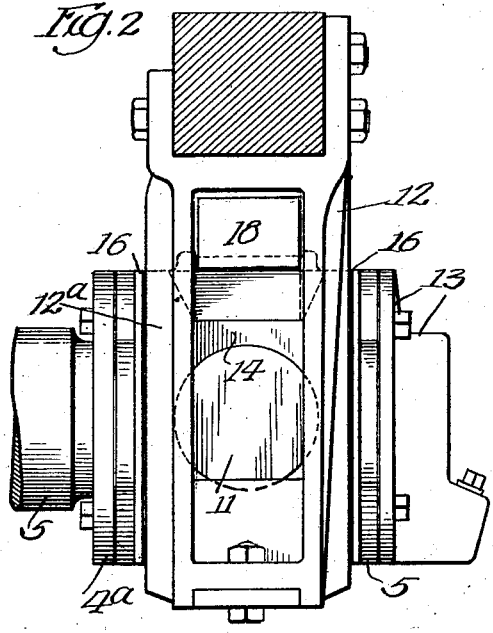
Figure 3:
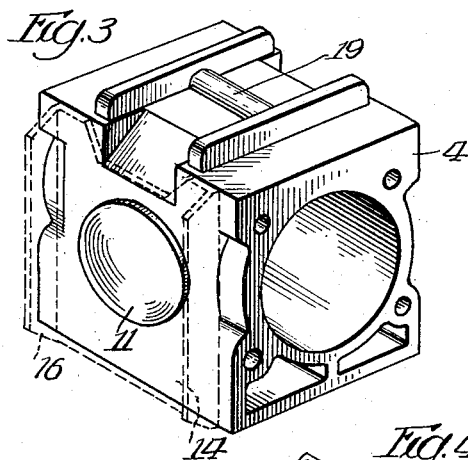
Figure 4:
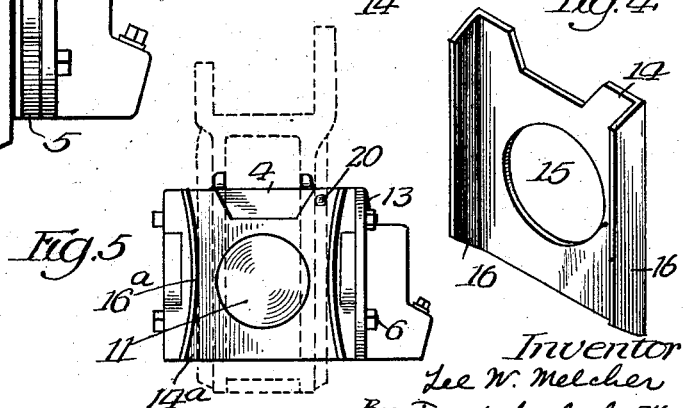
Figure 5:
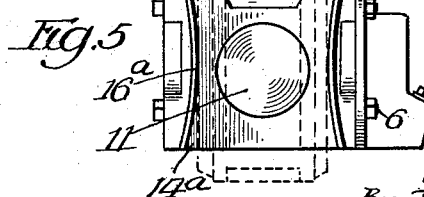

In the drawing which accompanies and forms a part of this specification or disclosure and in which like numerals of reference denote corresponding parts throughout the several views: Fig. 1 is a longitudinal section through a portion of a car truck which is provided with a journal box mounting embodying the invention. Fig. 2 is an end elevation. Fig. 3 is a perspective of the body part of the journal box. Fig. 4 is a perspective of a plate embodying one form of the invention. Fig. 5 is a side elevational view showing the journal box provided with a plate embodying the form of the invention wherein the flanges are deflected or bulged inwardly so as to permit the box to rock or tilt transversely to a limited extent.

The mounting which is exhibited in Figures 1, 2, 3 and 4 of the drawing comprises a journal box embodying a cast body 4, a ring 4ª at the inner end of the body, and a cap 13 at the outer end of the body. An axle 5 extends into the body through ring 4ª, terminates inwardly of the cap, and is carried by a roller bearing 10 between a cylindrical bearing surface in the body 4 and a sleeve 9 which is fixed to the axle. Bolts 6 secure ring 4ª, body 4, and cap 13 together. For a more detailed description of the box and bearing reference may be had to an application for Letters Patent filed by me March 10, 1928, and serially numbered 260,585.

Circular studs 11 are formed integrally with and project outwardly from the sides of the body 4. The box is slidable in the legs 12ª of a pedestal 12 and is connected thereto by a pair of rectangular guide-plates 14 which are formed separately from the box, and are interlocked with the box for conjoint movement relatively to the pedestal by studs 11 which fit in circular holes 15 in said plates. Studs 11 permit the box to pivot relatively to the plates 14, so that it may rock or tilt with the axle. The plates 14 are formed of stamped metal. They fit between the inner faces of the pedestal legs 12ᵃ and the sides of the box and have the side margins thereof bent or deflected outwardly to form vertical flanges 16 which lap the front and rear guide faces of the pedestal legs and hold the box and the pedestal against relative transverse movement. An equalizer bar 18 engages a seat 19 which is formed on the top of box-body 4.

In operation, the plates 14 are interlocked with the box-body 4 by means of studs 11 to permit relative vertical movement between the pedestal and the box. When the axle is tilted transversely relatively to the car truck, the plates 14 will rock around studs 11, the flanges 16 being in engagement with the legs 12ᵃ so the plates cannot rock. In this construction, the box has unlimited pivotal movement relatively to the pedestal, so that under normal and abnormal conditions it will not interfere with the tilting of the axle.

In the form of the invention that is shown in Fig. 5, the guide-plates 14ᵃ are provided with inwardly bulged crowned flanges 16ᵃ to permit sufficient relative tilting between the plates and the pedestal legs under normal operating conditions. In this construction, the plates are connected to the box by studs 11, as hereinbefore described, but the plates are also secured to the box, so as to be held in fixed relation thereto under normal operating conditions; for example, by spot welding each at one point, as at 20, to the box body. This weld is sufficiently secure to hold the box and guide-plates against relative pivotal movement during normal tilting of the axle, and sufficiently insecure to permit the weld to break under abnormal conditions, such as when the truck runs off the track. When the welded parts break unlimited pivotal movement of the box relatively to the plates and pedestal is permitted.

The mounting which is herein disclosed may be manufactured at a comparatively low cost by virtue of the fact that the guide plates are formed of metal stampings. Inasmuch as the plates are formed separately from the journal box it is not necessary to replace the box when breakage occurs to the flanges which operate as pedestal guides. By bulging inwardly the flanges of the stamped metal plates, a limited pivotal movement of the box is permitted. By connecting the plates to the box by means of circular studs and welding the plates to the sides of the box additional tilting or pivotal movement of the box is permitted whenever abnormal tilting of the axle occurs.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a car truck, the combination of a pedestal having legs, a journal box in the pedestal, and guide plates formed separately from and connected pivotally to the sides of the box and provided at the ends thereof with outwardly extending flanges for engaging slidably the legs of the pedestal, said flanges being shaped so as to permit the box to rock or tilt to a limited extent relatively to the pedestal.

2. In a car truck, the combination of a pedestal having legs, a journal box in the pedestal, guide plates associated with the sides of the box and provided with outwardly extending flanges for engaging slidably the legs of the pedestal, said flanges being shaped to permit the box to rock or tilt to a limited degree relatively to the pedestal, pivotal connections between the box and the plates whereby said box is permitted to tilt to a greater extent, and breakable means for connecting the box rigidly to the plates so that normally the pivotal connections are inoperative.

Signed at De Pere, Wisconsin, this 28th day of January, 1929.

LEE W. MELCHER.